Feb. 13, 1968    D. BLATCHFORD ET AL    3,368,776
METHOD OF DETERMINING THE LAUNCH TIME OF AIR-TO-AIR MISSILES
Filed Sept. 22, 1961    3 Sheets-Sheet 1

INVENTORS
DEAN BLATCHFORD
RICHARD L. HOLT
AGENT
ATTORNEY

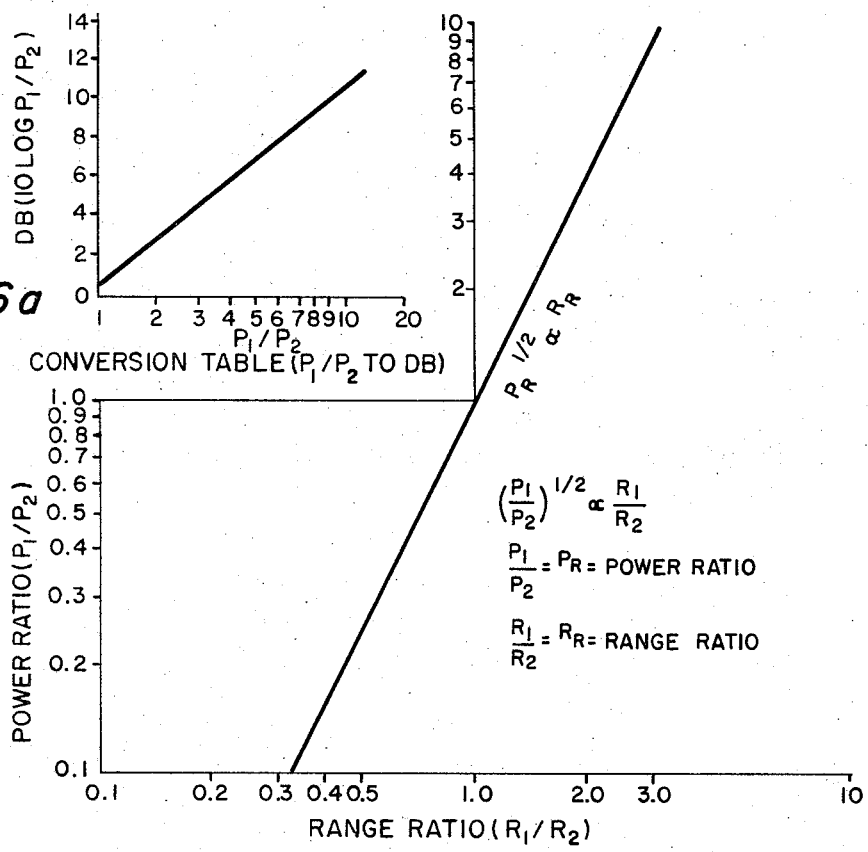
Fig. 6a
Fig. 6
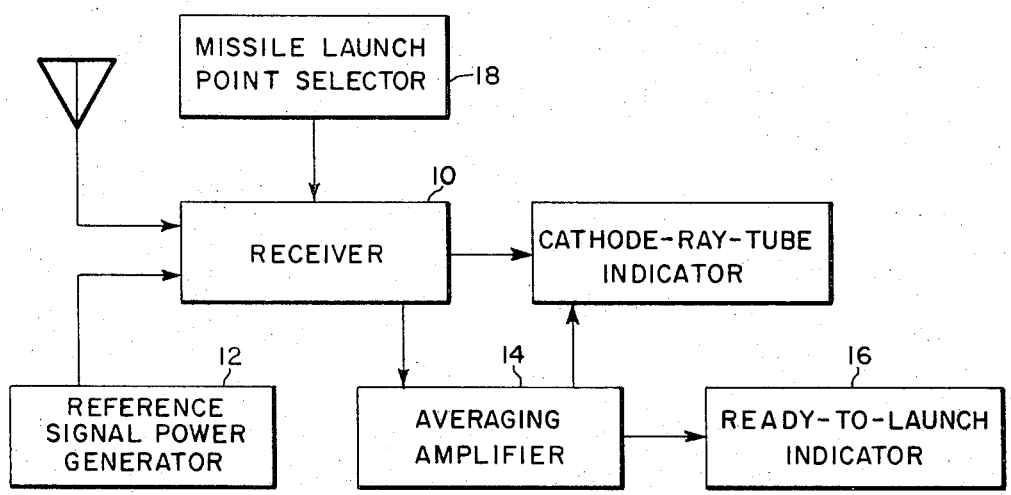
Fig. 7
INVENTORS
DEAN BLATCHFORD
RICHARD L. HOLT

3,368,776
METHOD OF DETERMINING THE LAUNCH TIME OF AIR-TO-AIR MISSILES

Dean Blatchford, Woodland Hills, and Richard L. Holt, Ventura, Calif., assignors to the United States of America as represented by the Secretary of the Navy
Filed Sept. 22, 1961, Ser. No. 140,974
2 Claims. (Cl. 244—3.1)

The invention described herein may be manufactured and used by or for the Government of the United States of America for governmental purposes without the payment of any royalties thereon or therefor.

The present invention relates to a method of determining an appropriate launch time for an air-to-air missile carried by a launching aircraft in a countermeasures environment where jamming energy radiated by an airborne target would normally preclude such a determination. The herein disclosed method provides for the selection of a missile launch time falling within the missile's maximum and minimum performance limits for a particular flight trajectory with respect to such target.

There are several possible methods of determining the proper launching time for an air-to-air missile. Of such methods, there are two techniques in particular which have received considerable attention: these are (1) measuring the range from the missile-carrying aircraft to a jamming-signal target by geometric triangulation when a fixed base line can be established, and (2) measuring the range of the jamming-signal target by solving the geometry resulting from the difference in path lengths of the direct and reflected jamming signal rays. The measurement of a base line in technique (1) is not always feasible, since the location of the ends of this base line are continually changing. Furthermore, a communication link is required between the two receivers at which the measurements are taken, and, still further, the identification of a particular signal in a multiple-signal environment is difficult. Above all, however, the communication data link system is susceptible to countermeasures jamming. Technique (2) may be satisfactory for relatively short ranges of less than approximately 50 nautical miles, but is not generally reliable for ranges which appreciably exceed this distance. Furthermore, precision equipment and extremely sensitive receivers are required to detect the reflected jamming signals, and it has been ascertained that when the jamming source has a low power level the reflected energy may be of too low an amplitude for accurate measurement. Distortion of the incoming signals is also likely unless relatively complex circuitry is utilized, and this adds to the size and weight of the airborne detecting equipment.

At the present time a number of air-to-air missiles are specifically designed for launching from a combat aircraft toward airborne targets. Many of these missiles can be programmed to fly either in a direct path or in an "up-and-over" path. When the latter is selected, the missile can accomplish a "kill" only when the target lies between definite maximum and minimum distance limits from the launching point. Purely by way of example, these limits may be 150 and 30 nautical miles, respectively. If the missile is launched within such limits, there is reasonable assurance that it will impact the selected target.

Missiles of the type under consideration are customarily designed with certain electronic equipment including a command link, an active terminal seeker, and an AI (airborne intercept) radar. In a clear environment (that is, in the absence of electronic countermeasures) the missile is guided after launching by command signals transmitted from the launching aircraft during the mid-course phase of missile flight to a point in the vicinity of the airborne target. At this time the missile's active seeker locks onto the target, and a computer in the launching aircraft transfers the guidance control function from the "command" mode to the active terminal seeker mode. However, in a countermeasures environment, a missile of the type under consideration is designed to "home" on a jamming signal in either a countermeasures-homing (CMH) mode for mid-course guidance, or a home-on-jamming (HOJ) mode for terminal guidance. It is a characteristic of a system of the type being described that the missile can be launched in the CMH mode against a jamming source, or it can switch to this CMH mode during mid-course and continue to be guided in this manner to the "kill" point as long as the jamming signal is received by the weapon system.

As above pointed out, the various expedients which have been used up to the present time to ascertain an optimum launch time for such an air-to-air missile have either been unreliable or have required complex apparatus for their operation. It has now been found that there is an alternative process by means of which the missile launch point may be ascertained without employing either geometric triangulation or a measurement of the path length of both the direct and reflected jamming rays. This expedient, which forms the basis for the present disclosure, is predicated upon the principle that electromagnetic energy in traveling through space undergoes an attenuation the amount of which is a direct function of the distance through which this energy travels. In other words, this process, which may be termed a jamming-power-measurement (JAPOM) technique, enables the missile launch point to be predicted (in the presence of effective jamming by an airborne target) by measuring the change in the amplitude of this jamming signal at different instants of time. It should be emphasized that the technique to be hereinafter discussed is not one which enables an accurate measurement of range to be obtained, but rather is one by means of which the missile launch point may be predicted with reasonable assurance that the air-borne target from which the jamming signal originates will be within the performance limits of the missile for the particular flight trajectory which it will follow. When employing the method to be hereinafter set forth, no additional communication links are necessary, and, since the apparatus required to practice this method is extremely simple, a considerable reduction in both size and weight of the airborne receiver may be achieved without sacrificing operating efficiency.

The process of the present invention, in a preferred embodiment, is predicated upon the passive detection of the jamming signal and upon an accurate measurement of changes in the average jamming signal power level at successive instance of time. When employing this method it is not necessary to determine such variables as the velocity of the target or the magnitude of the jamming signal per se. It is also not necessary to have knowledge of some discrete range to the target. It is only required that the following items be known: (1) the maximum and minimum launch-range limits for securing a "kill" when the missile is launched in a particular (such as an up-and-over) trajectory; (2) the maximum radio line-of-sight at which a jamming signal from the target can be detected by the missile-carrying aircraft; (3) the *change* in range between the missile-carrying aircraft and the target with respect to a change in the attenuation of a jamming signal emanating from the target and received by the missile-carrying aircraft; and (4) a determination of whether the position of the missile-carrying aircraft at the contemplated time of missile launching lies within the missile's maximum and minimum performance limits for the particular flight trajectory selected.

One object of the present invention, therefore, is to provide a method of determining an appropriate launch time for an air-to-air missile carried by a launching aircraft in a countermeasures environment where jamming energy radiated by an airborne target would normally preclude the selection of a missile launch time falling within the missile's maximum and minimum performance limits for a particular flight trajectory with respect to such target.

A further object of the invenion is to measure the space attenuation of eltctromagnetic energy from a given source at successive instants of time, and to employ any variation between the measured quantities to yield information as to the change in distance of the point at which the energy emanates from the point at which the measurements are taken.

A further object of the invention is to provide information to the personnel on an aircraft on which an air-to-air missile is being carried which will enable such personnel to launch the missile with reasonable assurance that it will impact a particular target.

Other objects and many of the attendant advantages of this invention will be readily appreciated as the same become better understood by reference to the following detailed description when considered in connection with the accompanying drawings wherein:

FIG. 6 is a graph showing the linear relationship between the power contained in a jamming signal at two successive instants of time as against the distance ratio between the transmitting and receiving points at the same two instants of time;

FIG. 6a is a conversion table useful in interpreting the data of FIG. 6;

FIG. 7 is a block diagram of a preferred form of receiver capable of measuring the average jamming signal power radiated by an airborne target.

Figure 1:
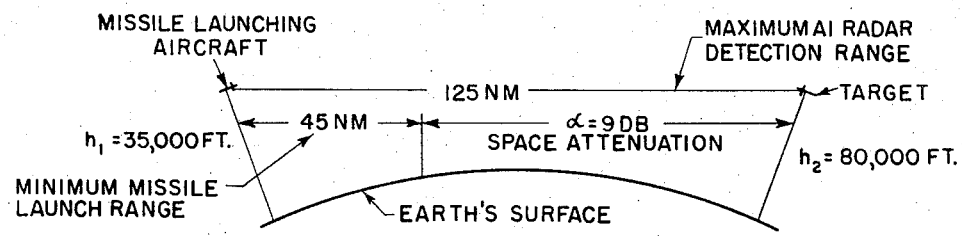
FIG. 1 is a geometric diagram indicating the minimum launch range of a representative air-to-air missile and also the maximum detection range capability of the radar carried thereby.
Figure 2:
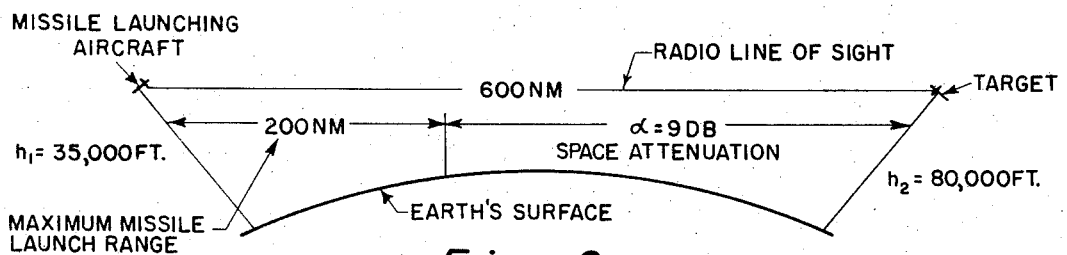
FIG. 2 is a geometric diagram indicating the maximum missile launch range as contrasted to the showing of FIG. 1, as well as the radio line-of-sight between the missile launching aircraft and the airborne target.

It will be appreciated that the region of particular interest insofar as the present invention is concerned is that in which jamming energy is received by the missile-carrying aircraft to thereby deny range information which is necessary to determine an optimum missile launch time. This region lies between the limits established by the maximum AI radar detection range (125 nautical miles in the example being discussed) and the maximum radio line-of-sight distance between the missile-carrying aircraft and the airborne target. Reference is made to FIGS. 1 and 2, respectively, as being representative of such operating limits for a missile-carrying aircraft altitude of 35,000 feet and a target altitude of 80,000 feet. It might be mentioned at this point that throughout the present discussion the radius of the earth is considered to be 4/3 that of its actual value to correct for refraction in the lower atmosphere. With this asumption, an analysis of a representative radio line-of-sight transmission range leads to the equation:

$$d = K(\sqrt{h_1} + \sqrt{h_2})$$

where $K = 1.23$,
$d$ = distance between the missile-carrying aircraft and the target aircraft in nautical miles,
$h_1$ = height of the missile-carrying aircraft in feet,
$h_2$ = height of the target aircraft in feet.

Figure 3:
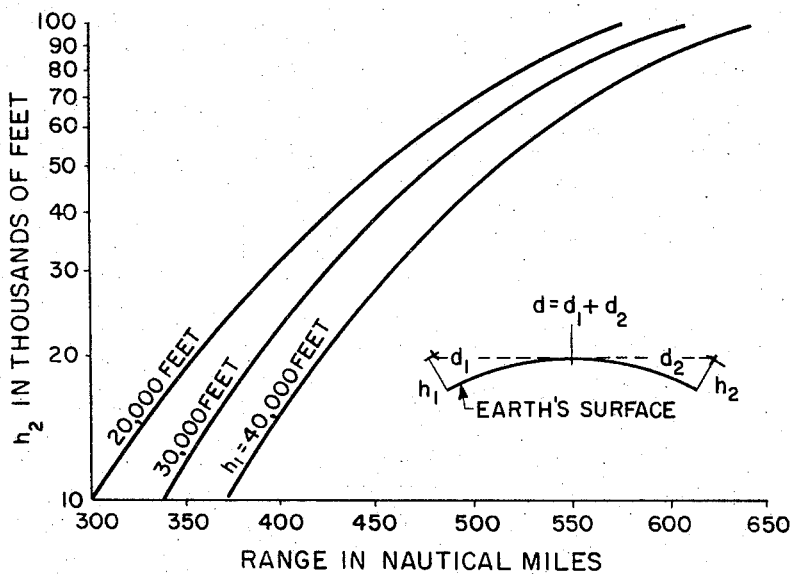
FIG. 3 is a graph indicating the line-of-sight propagation of electromagnetic energy between two points at varying heights above the earth's surface.

From the above analysis, the curves of FIG. 3 have been drawn, which bring out the relationship between the altitude of the missile-carrying aircraft, the altitude of the target aircraft, and the radio line-of-sight range. For example, with reference to this figure, if $h_1$, the altitude of the missile-carrying aircraft, is 35,000 feet, and if $h_2$, the height of the target aircraft, is 80,000 feet, then the line-of-sight range between the two aircraft is approximately 575 nautical miles. This represents the theoretical maximum range at which a jamming signal can be detected by the missile-carrying aircraft under the conditions set forth. It will be recognized, however, that once the target aircraft has entered the AI radio detection range (such as 125 nautical miles) *before* jamming commences, then the target will probably have been detected by the radar and passive ranging in accordance with the present invention is not required.

Figure 4:
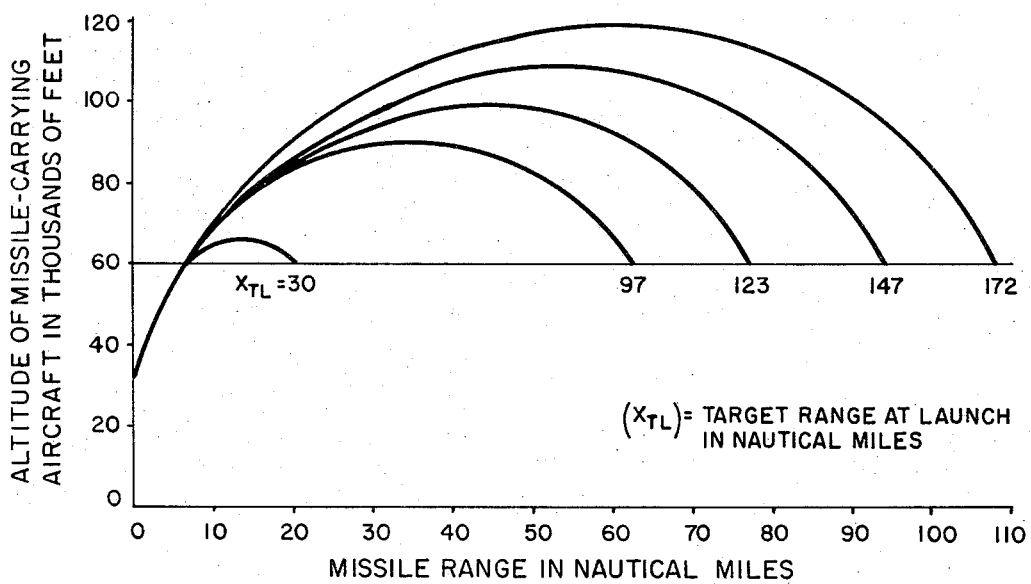
FIG. 4 is a graph showing representative trajectories which may be followed by an air-to-air missile following the launching thereof from the aircraft on which the missile is carried.

The performance capabilities of the missile are assumed to be known, and representative trajectories therefor (for the particular condition where the missile is launched against a head-on non-maneuvering target traveling at a speed of Mach 2 at an altitude of 60,000 feet) are set forth in FIG. 4. These trajectories illustrate the altitude of the missile plotted against missile range expressed in nautical miles, with the expression $X_{TL}$ denoting the target range at launch, expressed in nautical miles. With this information available, it is feasible to select a missile launch point such that the missile's range capabilities, as set forth in FIG. 4, for example, are not exceeded.

Figure 5:
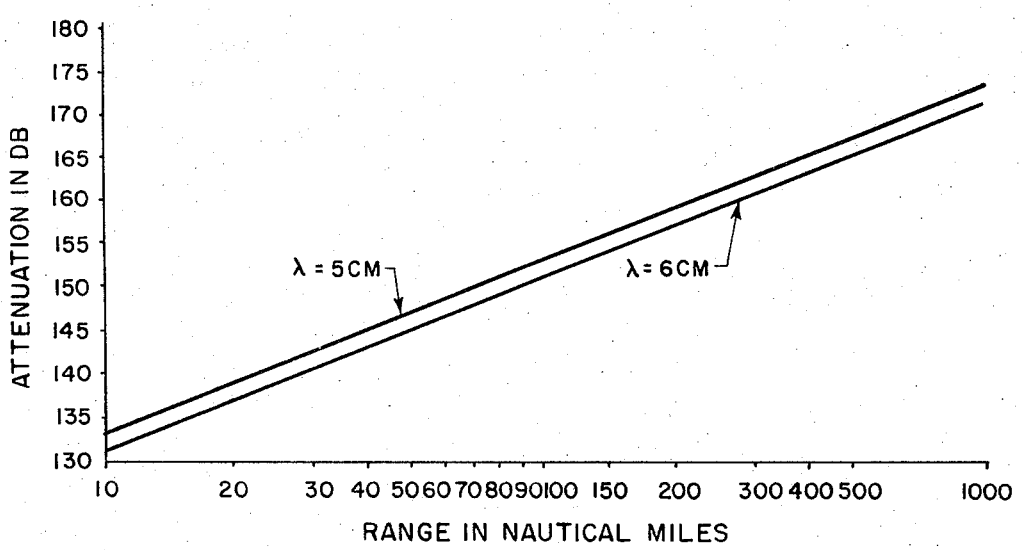
FIG. 5 is a graph showing the linear relationship between the attenuation of electromagnetic energy propagated through space and the distance through which such energy travels.

In discussing the principles underlying the present disclosure, it will be assumed that the jamming energy radiated by the target aircraft possesses a frequency such as has hitherto been generally employed for countermeasures purposes. In plotting the curves of FIG. 5, therefore, it has been assumed for purpose of illustration that the jamming transmitter operates on a frequency of either 5,000 megacycles ($\lambda = 6$ cm.) or 6,000 megacycles ($\lambda = 5$ cm.). For energy of these particular wave lengths, the C-band space attenuation in db plotted against range as expressed in nautical miles yields the proportionality $P_S \propto (\lambda/R)^2$, where $P_S$ = the received signal power and $R$ = the range in nautical miles. The above expression can be equated to:

$$\alpha = 38 + 20 \log_{10} FR$$

where $\alpha$ = the space attenuation in db, and
$F$ = the jamming frequency in megacycles.

Another important proportionality which can be obtained by analysis of the preceding equations is $$(P_1/P_2)^{1/2} \propto R_1/R_2$$

where $P_1$ = received jamming power at time #1,
$P_2$ = received jamming power at time #2,
$R_1$ = range between transmitter and receiver at time #1 in nautical miles,
$R_2$ = range between transmitter and receiver at time #2 in nautical miles.

Employing the above proportionality, it will be noted that whenever successive measurements of received jamming energy indicate a drop of 6 db, then the range between the two points in question has decreased to one-half of its original amount. For example, if the first range measurement indicated that the distance between the two points in question was 600 miles, then a subsequent measurement indicating a decrease in received signal power of 6 db would indicate that the original 600-mile range had dropped to 300 miles. An additional decrease of 6 db would represent a further range change of from 300 to 150 miles, and, similarly, a still further decrease of 6 db in received energy would bring the range between the two points down to 75 miles. If the original 600-mile range figure represented the maximum line-of-sight between the target and the missile-carrying aircraft (see FIG. 2) then such a drop of 18 db would show that the distance between the two points in question was then 75 miles, and, if this latter figure were within the performance capabilities of the missile, it could be launched with reasonable assurance that it would impact the target.

As a further example, an average signal power change of 9 db corresponds to a change in range by a factor of approximately 3, as shown by FIG. 6 when the conversion table of FIG. 6a is employed in conjunction therewith. Correlating this information with the geometric diagram of FIG. 1, it illustrates that such a change in space attenuation of 9 db results when the maximum AI radar detection range of 125 nautical miles is reduced to approximately 45 nautical miles, the latter figure representing the minimum missile launch range for the trajectory chosen (see FIG. 4) taking into consideration the height of both the target aircraft and the missile-launching aircraft at the instant of launching.

The same approximate space attenuation results when the range between the two points in question is reduced from 600 to 200 nautical miles, as shown in FIG. 2. In both examples, these reduced ranges (45 and 200 nautical miles, respectively) fall within the launch limits for the chosen flight trajectory of the missile when it is operating in a countermeasures environment.

It is, of course, necessary that the receiver carried by the missile-launching aircraft possess adequate sensitivity to detect and measure such changes in the average jamming signal power level. As an example, it has been found that a satisfactory unit is one capable of receiving a 1,000 watt jamming signal transmitted from a target aircraft 600 nautical miles away and yielding a 10 db advantage over the minimum useable signal. This is obligatory because of the degree of attenuation that results when the jamming energy has traveled through space for a distance sufficient to reduce the original power level by a factor which may be as high as approximately 170 db. The receiver of FIG. 7 consequently should be designed to incorporate a sensitivity, for example, of 130 dbw, which, together with an assumed antenna gain of 10 db. is adequate if the jammer signal power is in the neighborhood of 30 dbw and the gain of the jammer antenna is approximately 10 db. The apparatus of FIG. 7 may include, in addition to a conventional receiving unit 10, a reference signal power generator 12 the output of which is stable and predetermined in advance. Differences between the local reference signal power level and the received jamming signal power level are amplified at 14 and applied to a "ready-to-launch" indicator 16. By pre-selecting a desired missile launch point (when the received energy has dropped by some factor such as 9 db, for example) though the "programming" of a conventional network 18, the ready-to-launch indicator 16 may be energized only when this pre-selected condition has been reached.

It might be mentioned that the ideal tactical environment for employment of the present concept would make use of an additional aircraft separated from the missile-carrying aircraft by a distance of about 50 nautical miles. Thus, the maximum effective range from the missile-carrying aircraft is increased to approximately 650 nautical miles under the conditions above set forth as an example. The minimum limit for jamming power measurement (JAPOM), instead of being fixed at 125 nautical miles by the radar in the missile-carrying aircraft, would be extended to approximately 250 nautical miles if a 200-nautical-mile radar search capability is assumed for the auxiliary aircraft (which may be an AEW unit). As an example, assume that both the missile-carrying aircraft and the auxiliary aircraft radars are jammed from a point more than 200 nautical miles from the auxiliary aircraft. Under such conditions, an 18 db change in average jamming signal power (as measured by the receiver equipment carried in the auxiliary aircraft) would indicate a reduction in range of from 200 to 25 nautical miles, or from 600 to 75 nautical miles, both taken from the auxiliary aircraft. By virtue of the position of the auxiliary aircraft in relation to the missile-carrying aircraft, the missile launch point can be established when a potential enemy target is between 75 and 125 nautical miles from the missile-carrying aircraft. However, it should be noted that under such circumstances the transmission of information concerning an enemy target from the auxiliary aircraft to the missile-carrying aircraft may be susceptible to countermeasures. In is highly desirable, therefore, that both the auxiliary (AEW) aircraft and the missile-carrying aircraft carry the JAPOM equipment herein described.

Obviously many modifications and variations of the present invention are possible in the light of the above teachings. It is therefore to be understood that within the scope of the appended claims the invention may be practiced otherwise than as specifically described.

We claim:

1. The method of determining a launch time for an air-to-air missile carried by a launching aircraft in an environment in which jamming energy radiated by an airborne target would normally preclude the selection of a missile launch time falling within the missile's maximum and minimum performance limits for a particular flight trajectory with respect to such target, said method including the steps of locally generating a reference signal, developing a voltage variation having a given amplitude level representative of the magnitude of the jamming energy received from said target at a given instant of time, comparing said voltage variation with said reference signal, varying the reference signal until the amplitude thereof is equal to that of the said voltage variation, ascertaining the maximum radio-line-of-sight range between the target and the missile-carrying aircraft, subsequently developing on such aircraft a variation representative of the change in target range as a function of the space attenuation of the received jamming energy, and correlating such variation at any instant of time with the maximum and minimum performance limits of said missile so that the said missile launch time may be selected to fall within such limits.

2. In a method of determining a launch time for an air-to-air missile carried by a launching aircraft in a countermeasures environment where jamming energy radiated by an airborne target would normally preclude the selection of a missile launch time falling within the missile's maximum and minimum performance limits for a particular flight trajectory with respect to such target, such launch time being represented by the amplitude level of a first voltage, said method including the steps of generating on said missile-carrying aircraft a reference signal at a constant power level independent of the magnitude of the jamming energy radiated by said airborne target, measuring the average amplitude of the jamming energy received from said target at a given instant of time, comparing the average amplitude of such jamming energy with the said reference signal, varying the said reference signal until the amplitude thereof is equal to the average amplitude of the said jamming energy, measuring the average amplitude of the jamming energy received from said target with respect to the varied reference signal at an instant of time subsequent to that at which said first measurement was made, correlating the two measurements so made to obtain a difference signal the amplitude of which is representative of the amount of space attenuation undergone by said jamming energy during the time interval therebetween, the amount of such space attenuation being a function of the change in range between said missile-carrying aircraft and said target during the time interval between the two said measurements, and correlating the change in range between said missile-carrying aircraft and said target during the time interval between the two said measurements, as represented by the said difference signal, with the maximum and minimum performance limits of the missile for a particular flight trajectory with respect to said target so that a launch time is indicated when said difference signal is equal to the amplitude level of said first voltage.

References Cited

UNITED STATES PATENTS

| 3,020,397 | 2/1962 | Pierce et al. | 343—12 X |
| 3,141,161 | 7/1964 | King | 343—7 |

BENJAMIN A. BORCHELT, *Primary Examiner.*

CHESTER L. JUSTUS, SAMUEL FEINBERG,
*Examiners.*

A. E. HALL, L. L. HALLACHER, R. M. SKOLNIK,
*Assistant Examiners.*